US00RE46673E

(19) United States
(12) Reissued Patent
Lai et al.

(10) Patent Number: US RE46,673 E
(45) Date of Reissued Patent: Jan. 16, 2018

(54) OVER VOLTAGE AND OVER CURRENT PROTECTION INTEGRATED CIRCUIT

(71) Applicant: Intersil Americas LLC, Milpitas, CA (US)

(72) Inventors: Zheren Lai, Foothill Ranch, CA (US); Hsien Yi Chou, Shihlin (TW); Zengjing Wu, Irvine, CA (US)

(73) Assignee: INTERSIL AMERICAS LLC, Milpitas, CA (US)

(21) Appl. No.: 14/448,508

(22) Filed: Jul. 31, 2014

Related U.S. Patent Documents

Reissue of:
(64) Patent No.: 8,232,772
Issued: Jul. 31, 2012
Appl. No.: 12/127,283
Filed: May 27, 2008

U.S. Applications:
(62) Division of application No. 11/144,568, filed on Jun. 3, 2005, now Pat. No. 7,394,223.

(60) Provisional application No. 60/576,865, filed on Jun. 3, 2004.

(51) Int. Cl.
*H02J 7/00* (2006.01)

(52) U.S. Cl.
CPC ..... *H02J 7/0031* (2013.01)

(58) Field of Classification Search
CPC ..... H02J 7/00; H02J 7/0029; H02J 7/0031
USPC ..... 320/134, 136; 361/90, 91.1, 101
See application file for complete search history.

(56) References Cited

U.S. PATENT DOCUMENTS

| | | | | |
|---|---|---|---|---|
| 5,488,218 | A * | 1/1996 | Olsen et al. | 219/492 |
| 5,539,299 | A * | 7/1996 | Fernandez et al. | 320/163 |
| 5,991,175 | A * | 11/1999 | Liu | 363/56.1 |
| 6,018,229 | A * | 1/2000 | Mitchell et al. | 320/112 |
| 6,046,575 | A * | 4/2000 | Demuro | 320/134 |
| 6,111,388 | A * | 8/2000 | Mukainakano | 320/134 |
| 6,992,463 | B2 * | 1/2006 | Yoshio | 320/134 |
| 6,998,818 | B2 * | 2/2006 | Xiong et al. | 320/134 |
| 7,394,223 | B2 | 7/2008 | Lai et al. | |
| 8,232,772 | B2 | 7/2012 | Lai et al. | |
| 2001/0021092 | A1 * | 9/2001 | Astala | 361/58 |
| 2003/0223170 | A1 * | 12/2003 | Ely | 361/91.1 |
| 2005/0145946 | A1 * | 7/2005 | Lee et al. | 257/355 |
| 2005/0168193 | A1 * | 8/2005 | Xiong et al. | 320/134 |

OTHER PUBLICATIONS

Maxim Integrated Products, Datasheet for MAX1894, Sunnyvale, CA; Apr. 2002, 19-2278; Rev. 0, pp. 1-16.

* cited by examiner

*Primary Examiner* — Linh M Nguyen
(74) *Attorney, Agent, or Firm* — Foley & Lardner LLP; Mark J. Danielson

(57) ABSTRACT

An integrated circuit is disclosed including a primary input for receiving an input voltage, a battery voltage input for receiving a battery voltage signal and an output for providing an output voltage higher than the battery voltage. First circuitry responsive to the input voltage is provided for turning off the output voltage responsive to an input over voltage condition. Second circuitry responsive to the battery voltage signal is provided for turning off the output voltage responsive to a battery over voltage condition. Third circuitry provides for over current protection.

21 Claims, 3 Drawing Sheets

OVER VOLTAGE AND OVER CURRENT PROTECTION INTEGRATED CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a divisional application of U.S. patent application Ser. No. 11/144,568 filed Jun. 3, 2005, entitled OVER VOLTAGE AND OVER CURRENT PROTECTION INTEGRATED CURCUIT, which claims benefit of U.S. Provisional Application Ser. No. 60/576,865, filed on Jun. 3, 2004, entitled OVER VOLTAGE AND OVER CURRENT PROTECTION INTEGRATED CIRCUIT, the specification of each are incorporated herein by reference.

TECHNICAL FIELD OF THE INVENTION

The present invention relates in general to over voltage and over current protection circuits, and more particularly, to a single integrated circuit containing both over current and over voltage protection for use in conjunction with other circuitry to provide redundant protection.

BACKGROUND OF THE INVENTION

Many systems, such as battery charging systems, require both over voltage and over current protection in order to prevent damage to electronic components included within a system such as a battery charging system. To date, protections from input over voltage, battery over voltage and charge current over current have required the use of three separate circuits and/or chips in order to protect a system from these over voltage and over current conditions. This is especially so with respect to Li-ion batteries. A Li-ion rechargeable battery is very sensitive to over charge. Over charging a Li-ion battery may lead to explosion, flame or other hazardous situations. A charging system needs to charge the battery to a high precision final voltage so that the battery is not over charged, neither under charged. From safety point of view, it is very critical that the Li-ion battery is properly protected against over charge. Over charge is typically a result of failures in a charging system. A charging system typically consists of an ac/dc converter (typically named a wall adapter or an ac adapter) and a charging circuit that provides precision current limit and precision final battery voltage. An over-charge protection function is typically residing in a Li-ion battery pack to protect the battery against charging system failures. However, some unqualified after-market battery packs do not have the protection function built-in, which greatly increases the risk of explosion, flame, or other hazardous situations when a single failure occurs in the charging system. When any of the above events occurs, the manufacture of the handheld device will be liable to any resulted damage.

The use of multiple chips for providing these protections requires a great deal of space within an electronic device, including three separate chips for providing the protections. Thus, there is a need for a chip for providing an electronic device with multiple types of over voltage and over current protection in order to save space within the electronic device requiring such over voltage and over current protection.

SUMMARY OF THE INVENTION

The present invention, disclosed and claimed herein, in one aspect thereof, comprises an integrated circuit including a primary input for receiving an input voltage, a battery voltage input for receiving a battery voltage signal and an output for providing an output voltage higher than the battery voltage. First circuitry responsive to the input voltage is provided for turning off the output voltage responsive to an input over voltage condition. Second circuitry responsive to the battery voltage signal is provided for turning off the output voltage responsive to a battery over voltage condition.

In another aspect of the present invention, there is also provided over current protection.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
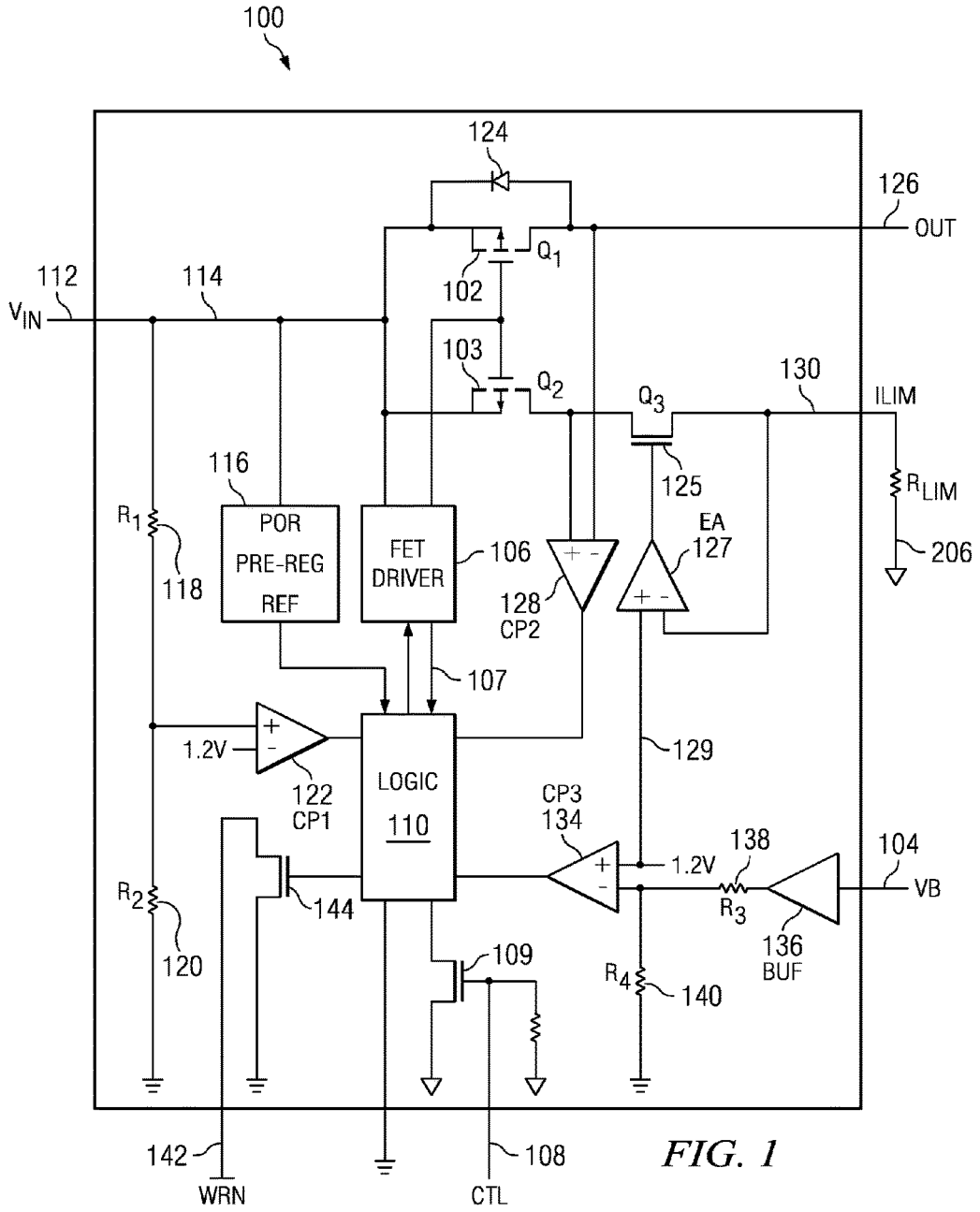
FIG. 1 is a block diagram of an integrated circuit providing both over voltage and over current protection.

Referring now to the drawings, and more particularly to FIG. 1, there is illustrated an over voltage, over current and overcharge protection IC 100. The over voltage and over current protection IC 100 is optimized for the safety of a battery charging system in, for example, a hand held system that utilizes a Lithium Ion battery which must be operated in a safe region in order to ensure that the battery does not catch fire or explode. The IC 100 protects three possible failure mechanisms in a charging system: input over voltage (the voltage input to the overall system), battery over voltage and charge current over current. When any of the above three failure mechanisms occur, the IC 100 turns off an internal p-channel MOSFET 102 to remove power from the charging system. Together with a battery charger IC (not shown) and a protection module in a battery pack, the charging system has triple level protection to limit the battery cell voltage in a safe region.

The input over voltage protection (OVP) threshold is set to 6.5V internally, but may be adjusted to other values easily using a metal spin. When the input voltage exceeds the programmed threshold, the IC 100 turns off the PFET 102 in less than 1 μs to prevent the high voltage input from damaging the electronics in a handheld system. The IC 100 is designed to withstand up to 30V of input voltage. The current in the PFET 102 is over current protected and the threshold is programmable with an external signal resistor up to 1.5 A. The over current protection (OCP) has a built-in delay to prevent false triggering. The battery OVP is realized through a battery voltage monitoring pin VB 104. The battery OVP threshold is set at 4.4V and a built-in 100 μs blanking time avoids mistakenly triggering the OVP by any transient voltage. All comparators in the integrated circuit 100 have hysteresis to prevent oscillation as the voltages are moving across the thresholds. The FET driver 106 is designed to turn on the internal PFET 102 slowly to avoid inrush currents at power up but will turn off the PFET 102 quickly in order to remove power before any damage occurs to a circuit. The IC 100 also includes a control input 108 to allow other logic circuits 110 to turn off the PFET 102.

The PFET 102 has a gate that is controlled in order to control the gate voltage, $V_{GS}$, thereof The $V_{GS}$ that is required to turn the PFET 102 on may be less than the full input voltage such that the gate voltage required to turn on the transistor is not necessarily ground and, therefore, the FET driver 106 is operable to lower the $V_{GS}$ voltage to a level sufficient to turn it on and with a profile that provides a relatively slow turn on in order to prevent a large inrush of current. Further, as will be described herein below, over current protection is inhibited until the PFET 102 is sufficiently turned on. Therefore, there is a control signal generated on a line 107 input to the logic block 110 that is operable to detect when the voltage $V_{GS}$ is large enough to sufficiently turn on the transistor in order to enable over current protection. When the voltage is at such a level, then the line 107 has a voltage disposed thereon indicating a threshold has been passed and will provide a logic signal to logic block 110.

The input pin VIN 112 provides a connection for the input power source. The VIN pin 112 is designed to withstand up to a 30V input. Input pin 112 is applied to a first node 114, which is connected to the input of the POR pre-reg ref 116. The POR pre-reg ref contains power on reset, pre-regulator and voltage references, which voltage references are provided with a band gap voltage generator, a temperature and voltage stable device. The power-on-reset prevents operation when the input voltage is below 2.5V. The pre-regulator outputs the power supply voltage for the control circuits. The reference generates the 1.2V band gap voltage, which is applied to a number of the comparators. The power on reset (POR) provides a POR threshold of 2.5V with a built-in hysteresis of 100 mV. Before the input voltage reaches the POR threshold, the power PFET 102 is off. Once the input voltage VIN exceeds the POR threshold, the IC 100 resets itself and starts to slowly turn on the power PFET 102. The slow turning on reduces the inrush current as well as the voltage drop during the transition. The input voltage VIN and the output voltage are monitored whenever the input is above the POR threshold, but the current is monitored only after the power PFET 102 is fully turned on, indicated by the voltage on the power PFET 102 gate and the signal on line 107.

Node 114 also applies an input to the FET driver 106. The FET driver 106 turns on the power PFET 102 slowly but turns off the power PFET quickly to avoid damage to the internal circuitry of an attached electronic device. The FET driver 106 is also connected to receive an input from logic circuit 110 and provides an input to logic circuit 110.

Node 114 also is connected to a resistor divider network consisting of a resistor R1 118 and a resistor R2 120 connected to the positive input of a comparator 122. The comparator 122 is the comparator for the input over voltage protection. The resistors 118 and 120 set the threshold for input over voltage protection. The input voltage applied at the VIN pin 112 is monitored by the comparator 122. Comparator 122 has an accurate reference of 1.2V from the band gap reference generated by the POR pre-reg ref 116. The over voltage protection threshold is set by the resistor divider network consisting of resistor 118 and resistor 120. The initial threshold is set to 6.7V. Metal options enable the threshold to be adjusted between 5.5V and 6.7V. The overall accuracy is better than three percent (3%) over the entire recommended operating conditions. When the input voltage exceeds the threshold, the comparator outputs a logic signal to the logic circuitry 110 to turn off the power FET 102 within 1 μs to prevent the input voltage from damaging the electronics in the associated system.

The FET driver 106 provides an output to the gates of power PFET 102 and sensor PFET 103. The drain/source path of power FET 102 has a diode 124 connected in parallel therewith with the cathode connected to node 114. This diode is the parasitic body diode that comes with the FET. The [source] *drain* of power FET 102 is connected to an output pin 126. The [source] *drain* of power transistor 102 is also connected to the negative input of a comparator 128. The positive input of a comparator 128 is connected to the [source] *drain* of sensor transistor 103. Comparator 128 is the over current protection comparator. Transistor 102 and transistor 103 have a size ratio of approximately 200:1. The over current protection (OCP) threshold is 200 times the current in transistor 103. Over current protection is disabled before the power FET 102 is fully turned on. The current in the power FET 102 is limited to prevent charging the battery with an excessive current. The current is sensed using the voltage drop across the power FET 102 after the power FET 102 is turned on. The reference of the over current protection is generated using the sensor transistor 103. The current in the sensor transistor 103 is forced to the value programmed by the ILIM pin 130 and an external VRLIM resistor 206. The ILIM pin 130 is the over current protection threshold setting pin. By connecting the resistor 206 between the ILIM pin 130 and ground (or some appropriate reference voltage), the over current protection threshold may be established. The size of the power PFET 102 is 200 times that of the sensor transistor 103; therefore, when the current in the power PFET 102 is 200 times of the current in the sensing FET 103, the drain voltage of the power FET 102 falls below that of the sensing FET 103. The comparator 128 then outputs a signal to the logic circuit 110 to turn off the power FET 102.

In order to define the current to sensor transistor 103, a current source is provided. This current source is provided in the form of a transistor 125 having the source/drain path thereof connected between the source/drain of transistor 103 and the ILIM input pin on one side of resistor 206. The gate of transistor 125 is connected to the output of a unity gate amplifier 127, the negative input thereof connected to the ILIM pin 130 and the positive input thereof connected to a node 129. This is driven by a 1.2V stable reference voltage. The amplifier 127 and transistor Q3, when connected on one side of the source/drain path to the node 130 on the ILIM pin 130, constitutes a current source. The 1.2V reference voltage, since it is stable, is reflected on the node 130 and the value of the resistor 206 defines the current there through. Thus, the current through transistor 103 is defined by the current through transistor 125. The current through transistor 103 will result in a known and fixed voltage drop, since there is a finite $R_{DSON}$. This is a temperature varying resistance. Similarly, transistor 102 has an $R_{DSON}$ that is significantly smaller than the $R_{DSON}$ of transistor 103, by a factor of approximately 200. However, it could be any number. Since the $R_{DSON}$ of both transistors varies with respective temperature, they will track each other over temperature. Thus, in order to detect whether the current through transistor 102 has increased above a predetermined threshold, which is above the current required to increase the voltage across $R_{DSON}$ of transistor 102 greater than the voltage across $R_{DSON}$ of transistor 103, the comparator 120 will detect such and output a signal indicative of this to the logic circuit 110.

The battery over voltage protection is realized with the VB pin 104. Comparator 134 monitors the VB pin 104 and issues an over voltage signal when the battery voltage exceeds a 4.4V (+ or −75 mV) battery over voltage protection (OVP) threshold. The battery voltage is applied through a buffer 136 that is used to minimize the load current from the battery. The current is a leakage current from the battery. The buffer 136 is designed so that no current is flowing out of the VB pin 104 even under failure modes. An external series 1 MΩ resistor $R_{OPT}$ (not shown) is required to minimize the current from the VB pin 104 to the battery under failure modes, which further enhance the safety of the charging system. Resistors R3 138 and R4 140 set the over voltage protection threshold at 4.4V for the battery. The threshold has a 150 mV built in hysteresis. Thus, the battery voltage has to come back to 4.25V before the battery over voltage signal is cleared. When comparator 134 indicates the over voltage, the power PFET 102 is turned off within 1 μs. The control logic 110 contains a counter that if the battery over voltage or over current (described above) event occurs sixteen times, the battery over voltage or the over current indication is latched and the power PFET 102 is turned off permanently, unless the IC 100 is powered down and then up again. Comparator 134 has a built-in 100 μs blanking time to prevent any transient voltage from triggering the over voltage protection. It is noted that the start-up is a "soft start" that requires a certain period of time for the turn-on of the transistor 102 in order to prevent any inrush current, in the event that the over current indication was faulty. Therefore, there will be slow turn-on and, if a determination of default still exists and a fast turn-off will then occur. This cycle will continue sixteen times. The length of time for each cycle is a function of the amount of time required to turn the transistor 102 on and to turn it off and for the sensing operations.

The leakage current flowing into or out of the VB pin 104 is minimized. This has two purposes. It first minimizes loading to the battery when an AC adaptor is not plugged in. Additionally, this allows the optional resistor $R_{OPT}$ of a 1 MΩ magnitude to be inserted between the VB pin 104 and the battery so that if the IC fails, the current to the battery is limited. When a 1 MΩ resistor is used, even a voltage level of 30V at the VB pin 104 can only result in a 30 μA current output, which can be easily absorbed by the leakage current of other devices connected to the battery. To minimize the leakage current, a buffer is usually needed at the VB pin.

Metal options are required to adjust the center of the over voltage protection threshold within a +/−50 mV range of the 4.4V threshold.

The IC 100 has a control pin 108 used either as a control input or as an indication input. This is input to the gate of a transistor 109, having the source/drain path connected between ground and a control input to logic circuit 110. The control input allows other logic circuits to turn off the PFET 102. When the control pin 108 is driven to a logical high level, the power PFET 102 will be turned off. Driving the control pin 108 low or leaving it floating turns on the PFET 102. This pin 108 with the internal 200 kΩ pull-down transistor 109 is compatible with 1.8V logic.

The WRN pin 142 is an open-drain output that indicates a LOW signal when any of the three over current or over voltage protection conditions occur. This allows the microprocessor to give an indication to the user to further enhance the safety of the charging system. The WRN pin is connected to a transistor 144 having the gate thereof connected to the logic circuit 110.

Figure 3:
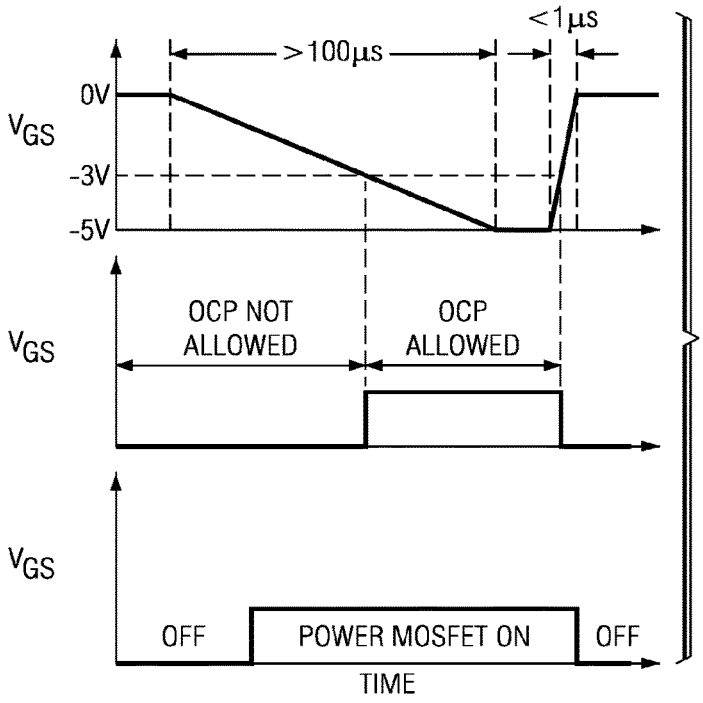
FIG. 3 is a timing diagram for the gate voltage of the power FET of the circuit of FIG. 1.

The FET driver 106, as described herein above, is designed to turn on the power PFET 102 slowly to avoid inrush current at power up but will turn off the power PFET 102 quickly in order to remove the power before any damage occurs. FIG. 3 illustrates the timing diagram for drawing the gate voltage thereof The initial gate voltage is zero voltage. When the gate voltage starts to turn on the power FET 102, the gate voltage slowly drops. When the gate voltage reaches approximately −1V threshold voltage (referenced to the source of the FET), the PFET 102 starts to turn on. The over current protection circuit is not allowed to affect the gate control until the gate voltage drops further to approximately −3V to ensure fully turning on the power FET 102. When the power FET 102 needs to be turned off, the gate voltage is pulled to the source voltage within 1 μs. The asymmetrical speeds of turning on and off the power FET 102 also creates delays for the 16 counts of battery over voltage protection and/or over current protection events.

There are six inputs to the control logic block 110: the three comparator outputs, the power-on-reset comparator output, the gate voltage comparator output from the gate driver block, and the CTL logic input. The gate voltage comparator output gates the OCP signal to disable the OCP functions when the power MOSFET is not fully turned on. The control logic 110 also contains a 4-bit counter for counting the OCP and battery OVP events. When both events reach 16 counts, the power FET is turned off permanently. All other five signals can turn off the power FET 102. The control logic also has two output signals. One signal goes to the gate FET driver 106 to turn off the power FET 102 and the same signal is used to drive the open drain WRN output. Note that the logic block 110, as well as all other circuit elements on IC 100, are powered by VIN.

Figure 2:
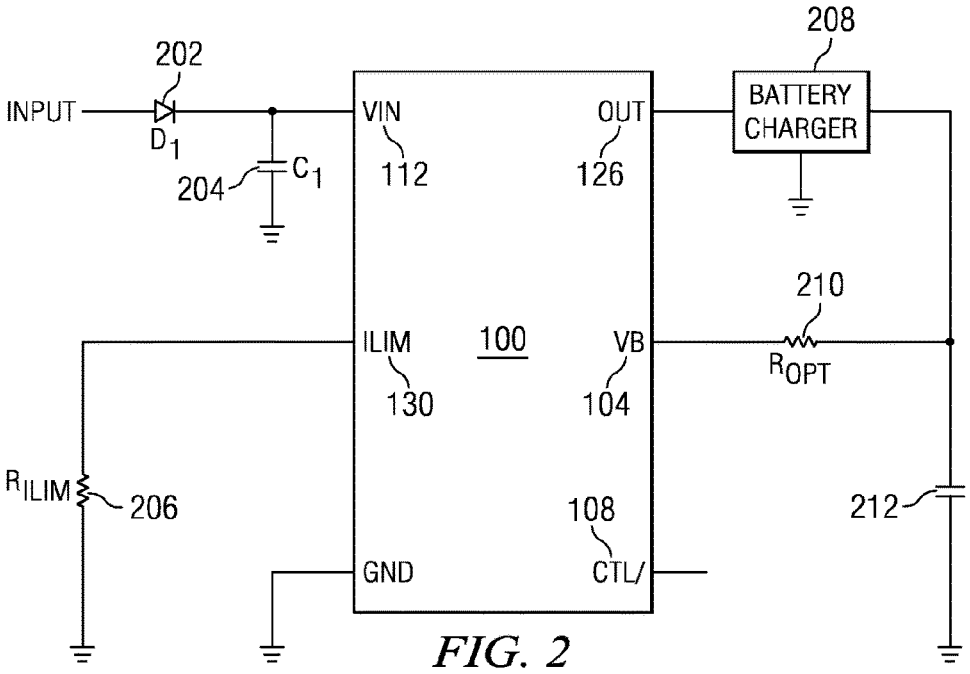
FIG. 2 is a block diagram illustrating an application of the circuit of FIG. 1 with a battery charger.

Referring now to FIG. 2, there is illustrated a typical application circuit using the over voltage protection and over current protection IC 100 described herein above. The IC 100 has connected at its input a diode 202 and capacitor 204. The resistor $R_{ILIM}$ 206 is connected to the ILIM pin 130. By connecting the resistor $R_{ILIM}$ 206 between the ILIM pin 130 and ground, the over current protection threshold may be established. A battery charger 208 is connected to the output pin 126. A resistor $R_{OPT}$ 210 is connected between the VB pin 104 and the battery 212 to protect from currents as described herein above.

Figure 4:
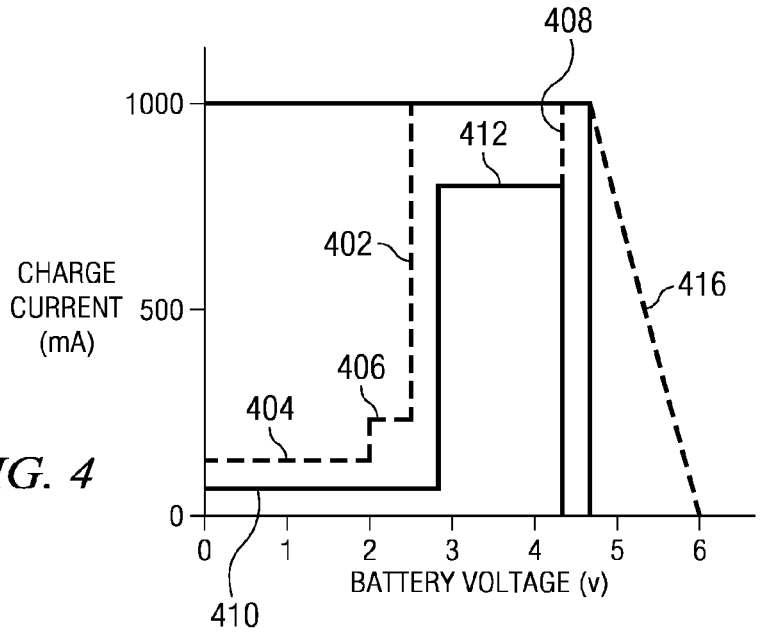
FIG. 4 illustrates the operation regions of a battery charger output and the integrated circuit of FIG. 1 output.

Referring now to FIG. 4, there is illustrated a voltage specification for the operation of the combination of the IC chip 100 and the battery charger 208. The battery charger 208 can be any type of battery charger chip, one being the ISL 6292C, manufactured by Intersil. This is a conventional battery charger chip that outputs voltage and current and provides internal protection thereto. There is provided a specified limit to the battery charger operation, this is referred to by a dotted line 402 that defines the maximum current versus voltage, which can be seen to be flat at around 100 mA and a flat portion 404 and then rises to a level of approximately 250 mA at a voltage of 2.0V to a current of 250 mA at a flat portion of the dotted line 406. At a voltage of approximately 2.5V, the battery charger is confined to a current of approximately 1,000 mA. At a voltage of 4.2V, the battery voltage, a portion of a dotted line 408 limits the voltage. The battery charger 208 is designed such that it will limit the current to a current of less than 100 mA at a flat portion 410 and, at a voltage of approximately 2.7V, would allow the current to rise to a level of approximately 750 mA at a limit 412. The charger outputs voltage is limited to 4.2V. Therefore, the charger can operate in two modes, a constant current mode, which is typical on charging and, once it reaches a certain voltage, it will then go into a constant voltage mode and the current will reduce. However, the portion 410 and the portion 412 define the limits as to the amount of current versus voltage that the charger can provide as an output. Therefore, when an over-voltage condition occurs, the current will be shut down to "0". When the current reaches a limit above 750 mA, this current will be limited. The logic chip 110 provides a limit of 1,000 mA for all voltages such that, in the event of a failure of the battery charger 208, the current cannot exceed that limit, i.e., if the current through the transistor 102 exceeds that limit, it will turn off. The voltage battery is limited to 4.4V, after which current will be shut down to a value of "0." There is provided an outside boundary dotted line 416, which represents the absolute maximum current and voltage that the battery can operate on. Current above this at voltages above those associated with the line 416 could result in damage to the battery or even fire. Therefore, any current limiting must be maintained below that.

Figure 5:
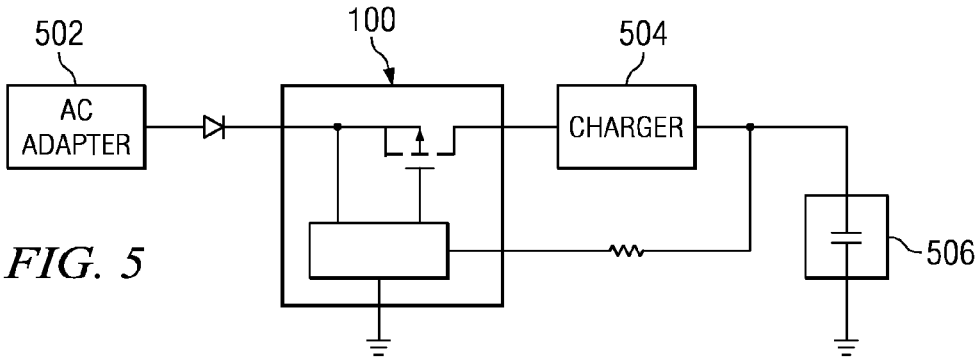
FIG. 5 is a basic functional block diagram of a charging system.

A complete charging system is illustrated in FIG. 5, including an AC adaptor 502, the over voltage and over current protection IC 100, a battery charger 504, and a battery pack 506. Each of these units within the system are capable of failure. When any two of the blocks fail, the following consequences will occur. When the AC adaptor 502 and the integrated circuit 100 fail, the battery charger 504 will also fail, but the protection module in the battery pack 506 will protect the battery cell. When the AC adaptor 502 and the battery charger 504 fail, both the integrated circuit 100 and the battery pack 506 will protect the battery cells. When the AC adaptor 502 and the battery pack 506 fail, the battery charger 504 will limit the battery voltage, and the IC 100 provides an additional level of protection. When the IC 100 and the charger 504 fail, the protection module in the battery pack 506 will protect the battery cells. When the IC 100 fails and the battery pack 506 fails, the battery charger 504 will limit the battery voltage to 4.2V within a 1% error. Finally, when the battery charger 504 and the battery pack 506 fail, the IC 100 will sense an over voltage case and remove power from the system. Thus, as can be seen, there is at least another level of protection available when any two blocks in the system may fail.

Figure 6:
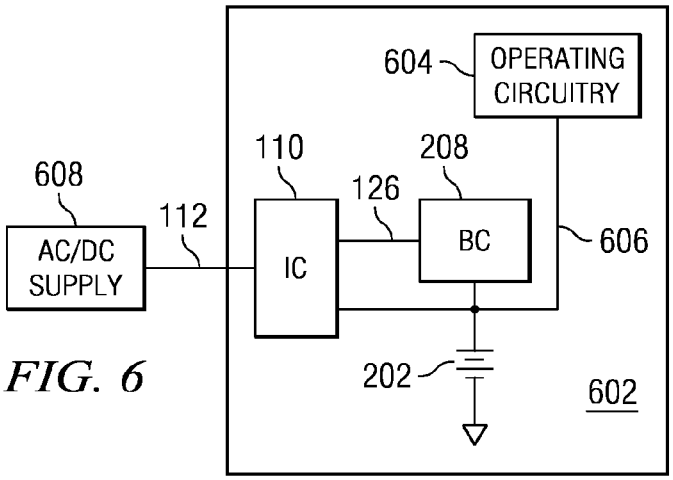
FIG. 6 illustrates a hand-held application of the integrated circuit.

Referring now to FIG. 6, there is illustrated another application of the IC 110. In this application, there is a self-contained unit, such as a hand-held telephone or other appliance. This would include within a casing 602 various operating circuitry 604. This operating circuitry 604 operates from a power supply line 606, which is connected to the top of the battery 202. Therefore, it operates on the voltage at the battery level. Therefore, it can be seen that the battery charger 208, when charging, can charge the battery 202 and, if the battery charge state is too low, can actually provide current for the operating circuitry when an AC/DC supply source 608 is plugged into the VIN input 112 of the IC 110. The IC 110, as noted herein above, isolates the pin 112 from the output pin 126 that drives the battery charger 208. It is possible, in an alternate embodiment (not shown), that the operating circuitry 604 can operate, during charging, from the input to the battery charger 208. This would require switches internal to the circuit and regulators such that the voltage on line 606 were regulated. Typically, the operating circuitry 604 will have built-in regulation circuits such that the voltage to the battery can be regulated to a fixed voltage for operating thereon.

In summary, the system of the present disclosure offers a minimal system (a simple single chip) to provide a redundant protection against failures of the charging system, so that any single failures in the charging system will not lead to over charging the Li-ion battery. Taking the protection function in the battery pack into account, the battery is free from over charge when two failures happen in the charging system simultaneously. Such redundant protection greatly reduces the risk of over charging the Li-ion battery. In addition to protecting the battery, this single chip in this invention also protects other electronic components in the handheld device against over voltage failure at the input.

Although the preferred embodiment has been described in detail, it should be understood that various changes, substitutions and alterations can be made therein without departing from the spirit and scope of the invention as defined by the appended claims.

What is claimed is:

1. A method for protecting a load operating at a set operating voltage, comprising the steps of:

receiving on a primary input an input voltage at a level above the set operating voltage;

driving on an output a voltage translating circuit that is operable to lower the input voltage level to the set operating voltage level;

connecting the primary input to the output with a switch;

detecting an input over voltage condition wherein the input voltage exceeds a predetermined input over voltage limit;

generating an input over voltage control signal responsive to detection of the input over voltage condition;

detecting a battery over voltage condition wherein a variable battery voltage level to which a battery is currently charged exceeds the set operating voltage by a predetermined battery over voltage limit;

generating a battery over voltage control signal responsive to detection of the battery over voltage condition;

disconnecting the primary input from the output using a switch responsive to the input over voltage control signal when an input voltage limit is exceeded by the input voltage; and disconnecting the primary input from the output using the switch responsive to the battery over voltage control signal when the battery voltage level exceeds the battery over voltage limit.

2. The method of claim 1, and further comprising the step of detecting an over current condition where the current through the switch exceeds a predetermined current limit and generating an over current control signal responsive thereto.

3. The [protection circuit] *method* of claim 2, wherein the load is a battery.

4. The method of claim 3, wherein the voltage translating circuit comprises a battery charger which has associated therewith internal protection circuitry for protecting for an input over voltage condition above a predetermined voltage level and for protecting the battery from a battery over voltage condition.

5. An integrated circuit, comprising:

a primary input for receiving an input voltage;

a battery voltage input for receiving a variable battery voltage level defining a current voltage level to which a battery is charged by a regulated charging voltage;

an output for providing an output voltage higher than the variable battery voltage level to a battery charger for generating the regulated charging voltage for charging the battery;

first circuitry responsive to the input voltage for generating an input over voltage control signal responsive to a determination that the input voltage exceeds an input over voltage limit;

second circuitry responsive to the variable battery voltage level for generating a battery over voltage control signal responsive to a determination that the variable battery voltage level exceeds a battery over voltage limit; and a switch connecting said primary input to said output, wherein said switch is responsive to the input over voltage control signal for controlling said switch to disconnect the primary input from the output when the input voltage limit is exceeded by the input voltage and further wherein said switch is also responsive to the battery over voltage control signal for controlling said switch to disconnect the primary input from the output when the battery over voltage limit is exceeded by the battery voltage level.

*6. An integrated circuit, comprising:*

*an input node configured to receive an input voltage;*

*an output node configured to be coupled to a battery charger that is configured to charge a battery;*

*a sense node configured to receive a battery voltage across the battery;*

*a switch coupled between the input and output nodes and configured to conduct a switch current; and*

*logic circuitry coupled to the input node, sense node, and switch, and configured to open the switch in response to at least two of a magnitude of the input voltage exceeding an input-voltage threshold, a magnitude of the battery voltage exceeding a battery-voltage threshold, and*

*a magnitude of the switch current exceeding a switch-current threshold.*

*7. The integrated circuit of claim 6 wherein the switch includes a PMOS transistor.*

*8. The integrated circuit of claim 6 wherein the logic circuitry is configured to open the switch within approximately 1 microsecond.*

*9. The integrated circuit of claim 6 further comprising:*

*an input-voltage sensor configured to signal the logic circuitry in response to the magnitude of the input voltage exceeding the input-voltage threshold;*

*a battery-voltage sensor configured to signal the logic circuitry in response to a magnitude of the battery voltage exceeding the battery-voltage threshold; and*

*a current sensor configured to signal the logic circuitry in response to a magnitude of the switch current exceeding a switch-current threshold.*

*10. The integrated circuit of claim 6, further comprising:*

*wherein the switch includes a transistor configured to conduct the switch current in response to a control signal; and*

*a disable circuit configured to disable, until the magnitude of the control signal exceeds a turn-on threshold, the logic circuitry from turning off the transistor in response to the magnitude of the switch current exceeding the switch-current threshold.*

*11. The integrated circuit of claim 6, further comprising a disable circuit configured to disable, for a delay period, the logic circuitry from opening the switch in response to the magnitude of the battery voltage exceeding the battery-voltage threshold.*

*12. The integrated circuit of claim 6, further comprising:*

*a counter configured to count a number of times that the logic circuitry opens the switch; and*

*a disable circuit configured to maintain the switch open in response to the number of times exceeding a count threshold.*

*13. The integrated circuit of claim 6, further comprising:*

*wherein the switch includes a transistor; and*

*a driver configured to turn on the transistor slowly enough to prevent a current through the transistor from exceeding an inrush threshold while the driver is turning on the transistor.*

*14. A system, comprising:*

*a battery charger having a charger input node, and having a charger output node configured to provide a charging signal to a battery; and*

*a protection circuit, including a protection-circuit input node configured to receive an input voltage, a protection-circuit output node coupled to the charger input node, a sense node configured to receive a battery voltage across the battery;*

*a switch coupled between the protection-circuit input and output nodes and configured to conduct a switch current; and*

*logic circuitry coupled to the protection-circuit input node, the sense node, and the switch, and configured to turn off the switch in response to at least two of*

*a magnitude of the input voltage exceeding an input-voltage threshold,*

*a magnitude of the battery voltage exceeding a battery-voltage threshold, and*

*a magnitude of the switch current exceeding a switch-current threshold.*

*15. The system of claim 14 wherein the charging signal includes a substantially constant voltage.*

*16. The system of claim 14 wherein the charging signal includes a substantially constant current.*

*17. The system of claim 14 wherein the battery charger and the protection circuit are disposed on a same integrated circuit.*

*18. The system of claim 14 wherein the battery charger and the protection circuit are disposed on respective integrated circuits.*

*19. A system, comprising:*

*a battery configured to generate a battery voltage;*

*a battery charger having a charger input node, and having a charger output node coupled to the battery; and*

*a protection circuit, including*

*a protection-circuit input node configured to receive an input voltage,*

*a protection-circuit output node coupled to the charger input node,*

*a sense node configured to receive the battery voltage;*

*a switch coupled between the protection-circuit input and output nodes and configured to conduct a switch current; and*

*logic circuitry coupled to the protection-circuit input node, the sense node, and the switch, and configured to deactivate the switch in response to at least two of a magnitude of the input voltage exceeding an input-voltage threshold,*

*a magnitude of the battery voltage exceeding a battery-voltage threshold, and*

*a magnitude of the switch current exceeding a switch-current threshold.*

*20. The system of claim 19 wherein the battery includes a lithium-ion battery.*

*21. The system of claim 19, further comprising operating circuitry coupled to the charger output node.*

* * * * *